US008078452B2

(12) United States Patent
Deane

(10) Patent No.: US 8,078,452 B2
(45) Date of Patent: *Dec. 13, 2011

(54) LEXICAL ASSOCIATION METRIC FOR KNOWLEDGE-FREE EXTRACTION OF PHRASAL TERMS

(75) Inventor: Paul Deane, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/814,730

(22) Filed: Jun. 14, 2010

(65) Prior Publication Data

US 2010/0250238 A1 Sep. 30, 2010

Related U.S. Application Data

(63) Continuation of application No. 11/100,362, filed on Apr. 6, 2005, now Pat. No. 7,739,103.

(60) Provisional application No. 60/559,718, filed on Apr. 6, 2004.

(51) Int. Cl.
*G06F 17/27* (2006.01)
*G06F 17/21* (2006.01)

(52) U.S. Cl. ................................... 704/9; 704/1; 704/10

(58) Field of Classification Search .................. 704/1, 9, 704/10
See application file for complete search history.

(56) References Cited

U.S. PATENT DOCUMENTS

| 5,355,311 | A | * | 10/1994 | Horioka | 704/1 |
| 5,406,480 | A | * | 4/1995 | Kanno | 704/10 |
| 5,423,032 | A | * | 6/1995 | Byrd et al. | 704/1 |
| 5,675,819 | A | * | 10/1997 | Schuetze | 704/10 |
| 5,867,812 | A | * | 2/1999 | Sassano | 704/10 |
| 6,081,775 | A | * | 6/2000 | Dolan | 704/10 |
| 6,101,492 | A | * | 8/2000 | Jacquemin et al. | 707/688 |
| 6,697,793 | B2 | * | 2/2004 | McGreevy | 1/1 |
| 6,859,771 | B2 | * | 2/2005 | Xun et al. | 704/1 |
| 6,925,433 | B2 | * | 8/2005 | Stensmo | 704/9 |
| 7,031,910 | B2 | * | 4/2006 | Eisele | 704/10 |
| 7,197,449 | B2 | * | 3/2007 | Hu et al. | 704/9 |
| 2003/0065501 | A1 | * | 4/2003 | Hamdan | 704/1 |
| 2003/0083863 | A1 | * | 5/2003 | Ringger et al. | 704/10 |
| 2003/0236659 | A1 | * | 12/2003 | Castellanos | 704/4 |

(Continued)

OTHER PUBLICATIONS

Smadja; Retrieving Collocations from Text: Xtract; Computational Linguistics; vol. 19; pp. 143-177; 1993.

(Continued)

*Primary Examiner* — Douglas Godbold
(74) *Attorney, Agent, or Firm* — Jones Day

(57) ABSTRACT

A method and system for determining a lexical association of phrasal terms are described. A corpus having a plurality of words is received, and a plurality of contexts including one or more context words proximate to a word in the corpus is determined. An occurrence count for each context is determined, and a global rank is assigned based on the occurrence count. Similarly, a number of occurrences of a word being used in a context is determined, and a local rank is assigned to the word-context pair based on the number of occurrences. A rank ratio is then determined for each word-context pair. A rank ratio is equal to the global rank divided by the local rank for a word-context pair. A mutual rank ratio is determined by multiplying the rank ratios corresponding to a phrase. The mutual rank ratio is used to identify phrasal terms in the corpus.

30 Claims, 2 Drawing Sheets

U.S. PATENT DOCUMENTS

2004/0253569 A1 12/2004 Deane et al.
2005/0049867 A1 3/2005 Deane

OTHER PUBLICATIONS

Dagan et al.; Termight: Identifying and Translating Technical Terminology; ACM Int'l Conference Proc. Series: Proc. of the 4th Conference on Applied Language Processing; pp. 34-40; 1994.
Justeson et al.; Technical Terminology: Some Linguistic Properties and an Algorithm for Identification in Text; Natural Language Engineering; 1(1); pp. 9-27; 1995.
Daille; Study and Implementation of Combined Techniques for Automatic Extraction of Terminology; in The Balancing Act: Combining Symbolic and Statistical Approaches to Language, Klavans & Resnik (Eds.); pp. 49-66; 1996.
Daille; Study and Implementation of Combined Techniques for Automatic Extraction of Terminology; Talana, University Paris; pp. 29-36; 1996.
Jacquemin et al.; Expansion of Multi-Word Terms for Indexing and Retrieval Using Morphology and Syntax; Proceedings of ACL; pp. 24-31; 1997.
Jacquemin et al.; NLP for Term Variant Extraction: Synergy Between Morphology, Lexicon, and Syntax; Natural Language Information Retrieval; pp. 25-74; 1999.
Boguraev et al.; Applications of Term Identification Technology: Domain Description and Content Characterisation; Natural Language Engineering; 5(1); pp. 17-44; 1999.
Frantzi et al.; Automatic Recognition of Multi-Word Terms: the C-Value and NC-Value Method; Int'l Journal on Digital Libraries; 3(2); pp. 115-130; 2000.
Maynard et al.; Identifying Terms by Their Family and Friends; COLING 2000; pp. 530-536; 2000.
Church et al.; Word Association Norms, Mutual Information, and Lexicography; Computational Linguistics; 16(1); pp. 22-29; 1990.
Dunning; Accurate Methods for the Statistics of Surprise and Coincidence; Computational Linguistics; 19(1); pp. 61-74; 1993.
Zipf; The Psycho-Biology of Language: An Introduction to Dynamic Philology; Houghton-Mifflin, Boston, Massachusetts; 1935.
Zipf; Human Behavior and the Principle of Least Effort; Addison-Wesley, Cambridge, Massagchusetts; 1949.
Ha et al.; Extension of Zipf's Law to Words and Phrases; Proc. of the 19th Int'l Conference on Computational Linguistics; 2002.
Kit; Corpus Tools for Retrieving and Deriving Termhood Evidence; 5th East Asia Conferences on Terminology; 2002.
Rules of Probability; http://web.archive.org/web/20001003132730/http://library.thinkquest.org/11506/prules.html; 2007.
Baayen; Word Frequency Distributions; Kluwer: Dordrecht; 2001.
Choueka; Looking for Needles in a Haystack or Locating Interesting Collocational Expressions in Large Textual Databases; Proceedings of the RIAO; pp. 38-43; 1988.
Dias et al.; Language Independent Automatic Acquisition of Ridid Multiword Units From Unrestricted Text Corpora; TALN; pp. 333-338; 1999.
Evert; The Statistics of Word Cooccurrences: Word Pairs and Collocations; PhD Thesis; Institut fur maschinelle Sprachverarbeitung, University of Stuttgart; 2004.
Evert et al.; Methods for the Qualitative Evaluation of Lexical Association Measures; Proc. of 39th Ann. Mtg. of the Assoc. for Computational Linguistics; pp. 188-195; 2001.
Ferreira Da Silva et al.; A Local Maxima Method and a Fair Dispersion Normalization for Extracting Multi-Word Units From Corpora; 6th Meeting on Mathematics of Language; pp. 369-381; 1999.
Gil et al.; Efficient Mining of Textual Associations; Int'l Conf. on Natural Language Processing and Knowledge Engineering; Chengquing Zong (Eds.); pp. 26-29; 2003.
Gil et al.; Using Masks, Suffix Array-Based Data Structures, and Multidimensional Arrays to Compute Positional N-Gram Statistics from Corpora; In Proc. of the Workshop on Multiword Expressions of the 41st Annual Meeting of the Association of Computational Linguistics; pp. 25-33; 2003.
Johansson; Catching the Cheshire Cat; In Proceedings of COLING 94; vol. II; pp. 1021-1025; 1994.
Johansson; Good Bigrams; In Proceedings from the 16th Int'l Conference on Computational Linguistics (COLING-96); pp. 592-597; 1996.
Krenn; Acquisition of Phraseological Units from Linguistically Interpreted Corpora; A Case Study on German PP-Verb Collocations; Proceedings of ISP-98; pp. 359-371; 1998.
Krenn; Empirical Implications on Lexical Association Measures; Proc. of the 9th EURALEX International Congress; 2000.
Krenn et al.; Can we do better than frequency? A case study on extracting PP-verb collocations; Proceedings of the ACL Workshop on Collocations; pp. 39-46; 2001.
Lin; Extracting Collocations From Text Corpora; First Workshop on Computational Terminology; pp. 57-63; 1998.
Lin; Automatic Identification of Non-computational Phrases; In Proc. of the 37th Annual Meeting of the Assoc. for Computational Linguistics; pp. 317-324; 1999.
Manning et al.; Foundations of Statistical Natural Language Processing; MIT Press, Cambridge, Massachusetts; 1999.
Pantel et al.; A Statistical Corpus-Based Term Extractor; In Lecture Notes in Artificial Intelligence, Stroulia & Matwin (Eds.); Springer-Verlag; pp. 36-46; 2001.
Resnik; Selectional Constraints: An Information-Theoretic Model and Its Computational Realization; Cognition 61; pp. 127-159; 1996.
Schone et al.; Is Knowledge-Free Induction of Multiword Unit Dictionary Headwords a Solved Problem?; Proc. of Empirical Methods in Natural Lang. Processing; pp. 100-108; 2001.
Sekine et al.; Automatic Learning for Semantic Collocation; Proceedings of the 3rd Conference on Applied Natural Language Processing; pp. 104-110; 1992.
Shimohata et al.; Retrieving Collocations by Co-occurrences and Word Order Constraints; Proc. of the 35th Ann. Mtg., Assoc. for Computational Linguistics; pp. 476-481; 1997.
Thanapoulos, et al.; Comparative Evaluation of Collocation Extraction Metrics; Proc. of the LREC 2002 Conference; pp. 609-613; 2002.
Deane; A Nonparametric Method for Extraction of Candidate Phrasal Terms; Proc. of the 43rd Annual Meeting of the ACL; pp. 605-613; 2005.
Lewis et al.; Natural Language Processing for Information Retrieval; Communications of the ACM; vol. 39, No. 1; pp. 92-101; 1996.
Lewis et al.; Natural Language Processing for Information Retrieval; Communications of the ACM; 1993.

* cited by examiner

LEXICAL ASSOCIATION METRIC FOR KNOWLEDGE-FREE EXTRACTION OF PHRASAL TERMS

RELATED APPLICATIONS AND CLAIM OF PRIORITY

This application is a continuation of the U.S. patent application Ser. No. 11/100,362, filed Apr. 6, 2005, now U.S. Pat. No. 7,739,103 entitled "Lexical Association Metric for Knowledge-free Extraction of Phrasal Terms." This application and the '362 application claim priority to and benefit of the U.S. Provisional Application No. 60/559,718, filed Apr. 6, 2004, entitled "A New Lexical Association Metric for Knowledge-Free Extraction of Phrasal Terms." All of these are hereby incorporated into this application by reference.

TECHNICAL FIELD

The embodiments disclosed herein relate generally to the fields of natural language processing and document evaluation. The embodiments particularly relate to methods and systems for identifying phrasal terms in a corpus.

BACKGROUND

The ordinary vocabulary of a language like English contains thousands of phrasal terms. A phrasal term is a multi-word lexical unit, such as a compound noun, a technical term, an idiomatic phrase, or a fixed collocation. The exact number of phrasal terms is difficult to determine because new phrasal terms are coined regularly. Moreover, it is sometimes difficult to determine whether a phrase is a fixed term or a regular, compositional expression. Accurate identification of phrasal terms is important in a variety of contexts, including natural language processing, question answering systems, information retrieval systems, and the like.

Distinguishing factors for the component words of phrasal terms as compared to other lexical units include the following: 1) the component words tend to co-occur more frequently; 2) the component words are more resistant to substitution or paraphrasing; 3) the component words follow fixed syntactic patterns; and 4) the component words display some degree of semantic non-compositionality. However, none of these characteristics are amenable to a simple algorithmic interpretation.

Any solution to the problem of variable length must enable normalization allowing direct comparison of phrases of different length. Ideally, the solution would also address the other issues—the independence assumption and the skewed distributions typical of natural language data.

While numerous term extraction systems have been developed, such systems typically rely on a combination of linguistic knowledge and statistical association measures. Grammatical patterns, such as adjective-noun or noun-noun sequences, are selected and ranked statistically. The resulting ranked list is then either used directly or submitted for manual filtering. Such systems include those described in F. Smadja, "Retrieving collocations from text: Xtract," Computational Linguistics, 19:143-77 (1993); I. Dagan & K. Church, "Termight: Identifying and translating technical terminology," ACM International Conference Proceeding Series: Proceedings of the fourth conference on applied natural language processing, Stuttgart, Germany pp. 39-40 (1994); J. S. Juteson & S. M. Katz, "Technical terminology: some linguistic properties and an algorithm for identification in text," Natural Language Engineering 1:9-27 (1995); B. Daille, "Study and Implementation of Combined Techniques from Automatic Extraction of Terminology," contained in "The Balancing Act: Combining Symbolic and Statistical Approaches to Language," J. Klavans & P. Resnik, eds., pp 49-66 (1996); C. Jacquemin, et al., "Expansion of multi-word terms for indexing and retrieval using morphology and syntax," Proceedings of ACL 1997, Madrid, pp 24-31; C. Jacquemin & E. Tzoukermann, "NLP for Term Variant Extraction: Synergy between Morphology, Lexicon, and Syntax," Natural Language Processing Information Retrieval, pp 25-74 (1999); and B. Bougarev & C. Kennedy, "Applications of Term Identification Technology: Domain Description and Content Characterization," Natural Language Engineering 5(1): 17-44 (1999), each of which is incorporated by reference herein in its entirety.

The linguistic filters used in typical term extraction systems have no direct connection with the criteria that define a phrasal term, such as non-compositionality, fixed order, non-substitutability, and the like. Instead, the linguistic filters function to eliminate improbable terms a priori and thus improve precision. An association measure then distinguishes between phrasal terms and plausible non-terms. Various measures have been used including a simple frequency, a modified frequency measure, and standard statistical significance tests, such as the t-test, the chi-squared test, log-likelihood, and pointwise mutual information. The modified frequency measures may include the c-value defined in K. Frantzi, et al., "Automatic recognition of multi-word terms: the C-Value and NC-Value Method," International Journal on Digital Libraries 3(2):115-30 (2000) and D. Maynard & S. Ananiadou, "Identifying Terms by Their Family and Friends," COLING 2000, pp 530-36 (2000), each of which is incorporated by reference herein in its entirety. K. W. Church & P. Hanks, "Word association norms, mutual information, and lexicography," Computational Linguistics 16(1):22-29 (1990) and T. Dunning, "Accurate methods for the statistics of surprise and coincidence," Computational Linguistics 19:1 (1993), each of which is incorporated herein by reference in its entirety, use various statistical significance tests.

However, none of the aforementioned methods provides adequate identification of phrasal terms. Indeed, the above methods generally fare worse than methods employing simple frequency orderings unless grammatical pre-filtering was performed on the input data. One explanation for the low precision of the above described lexical association measures on unfiltered data is the failure of the underlying statistical assumptions. For example, many of the tests assume a normal distribution, despite the highly skewed nature of natural language frequency distributions. Perhaps even more importantly, statistical and information-based metrics, such as log-likelihood and mutual information, measure significance or informativeness relative to the assumption that the selection of component terms is statistically independent. However, the possibilities for combinations of words are neither random nor independent. Use of linguistic filters such as "attributive adjective followed by noun" or "verb plus modifying prepositional phrase" arguably has the effect of selecting a subset of the language for which the standard null hypothesis—that any word may freely be combined with any other word—may be much more accurate. Additionally, many of the association measures are defined only for bigrams, and do not generalize well to phrasal terms of varying length.

Moreover, existing association methods are designed to measure the statistical relationship between word sequences and their component words without regard for alternative sequences. For example, judging "hot dog" to be a phrase would necessarily judge "the hot," "eat the hot," "dog quickly," "hot dog quickly," and numerous other word sequences to not be phrases using these association methods.

What is needed is a method of determining phrasal terms that improves upon the performance of previous lexical association methods.

A need exists for a method of determining phrasal terms based on a frequency-based measure.

A further need exists for natural language processing systems, essay evaluation systems, information retrieval systems, and the like which employ such a method.

A still further need exists for evaluating overlapping and alternative word sequences to determine if more than one phrasal term exists in a word sequence.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "phrasal term" is a reference to one or more phrasal terms and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In an embodiment, a method of determining lexical association for phrasal terms may include receiving a text having a plurality of words, determining a plurality of contexts including one or more context words proximate to a word in the text, determining a first frequency for each context based on a number of occurrences of the context within the text, assigning a first rank to at least one context based on the first frequency for the at least one context, determining a second frequency for each word-context pair based on a number of occurrences of the word being used in the context, assigning a second rank to at least one word-context pair based on the second frequency for the at least one word-context pair, determining a rank ratio for each word-context pair equal to the first rank divided by the second rank, determining a mutual rank ratio based on one or more rank ratios, and identifying a phrasal term using the mutual rank ratio.

In an embodiment, a system for determining lexical association for phrasal terms may include a processor and a processor-readable storage medium in communication with the processor. The processor-readable storage medium may contain one or more programming instructions for performing a method of determining lexical association for phrasal terms including receiving a text having a plurality of words, determining, via the processor, a plurality of contexts including one or more context words proximate to a word in the text, determining, via the processor, a first frequency for each context based on a number of occurrences of the context within the text, assigning, via the processor, a first rank to at least one context based on the first frequency for the at least one context, determining, via the processor, a second frequency for each word-context pair based on a number of occurrences of the word being used in the context, assigning, via the processor, a second rank to at least one word-context pair based on the second frequency for the at least one word-context pair, determining, via the processor, a rank ratio for each word-context pair equal to the first rank divided by the second rank, determining, via the processor, a mutual rank ratio based on one or more rank ratios, and identifying a phrasal term using the mutual rank ratio.

BRIEF DESCRIPTION OF THE DRAWINGS

Aspects, features, benefits and advantages of the disclosed embodiments will be apparent with regard to the following description, appended claims and accompanying drawings where:

DETAILED DESCRIPTION

Figure 1:
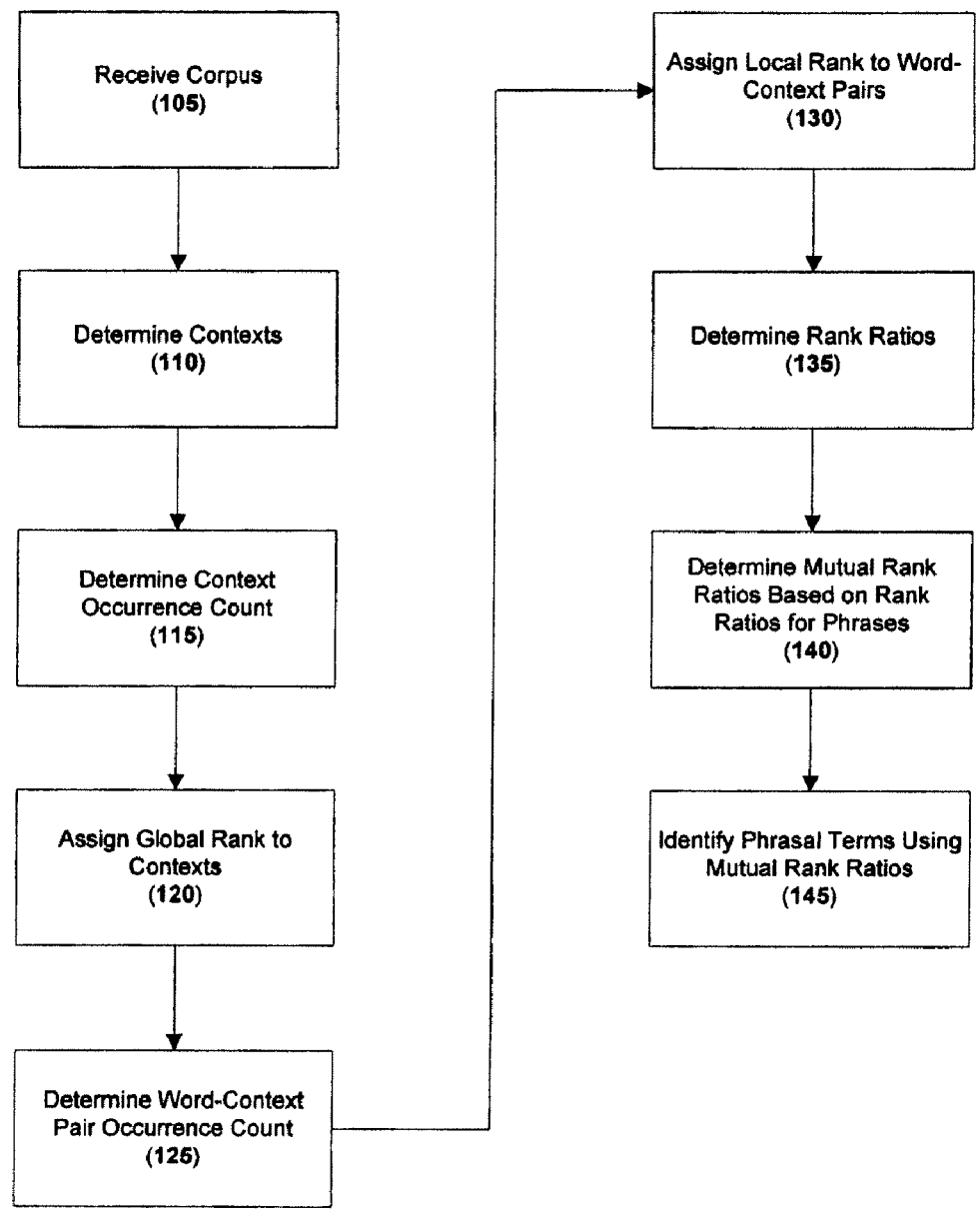
FIG. 1 depicts a flow diagram for a method of identifying phrasal terms from a corpus according to an embodiment.

No conventional lexical association measure considers the underlying frequency distribution of a corpus in identifying phrasal terms. In particular, no lexical association measure considers Zipfian frequency distributions, as disclosed in P. Zipf, "Psychobiology of Language," Houghton-Mifflin (1935) and P. Zipf, "Human Behavior and the Principle of Least Effort," Addison-Wesley (1949), each of which is disclosed herein by reference in its entirety.

A Zipfian frequency distribution may result from the observation that the frequency of words and other linguistic units tend to follow highly skewed distributions in which a large number of rare events may exist. The formulation of this observation has been termed Zipf's first law, which postulates, for single word frequency distributions, that the frequency of a word is inversely proportional to its rank in the frequency distribution. Mathematically, this observation may be stated as follows:

$$f_z(z, N) = \frac{C}{z^\alpha},$$

where z is the frequency rank;

$f_z(z,N)$ gives the frequency rank of z for a sample size of N;

C is a normalizing constant; and

α is a free parameter that determines the degree of skew (α is approximately 1 for single word frequency data).

An association metric incorporating a Zipfian distribution or a large number of rare events (LNRE) distribution may maximize the statistical validity for natural language text. The highly skewed nature of LNRE distributions, in which rank in a frequency spectrum is strongly tied to the underlying probability distribution, may demonstrate an adequate nonparametric approach based upon rank order. In other words, as long as a frequency is approximated by an inverse function of rank with parameter α greater than or equal to 1, rank may be substituted for other estimates of probability with very little loss of information.

In addition, a statistical comparison may be made for the entire set of word sequences that are distinguishable from phrasal terms, including, for example, longer sequences, subsequences, and overlapping sequences, despite the fact that these are not statistically independent events. Accordingly, constructing a non-parametric rank-based lexical association that allows for direct comparison of sequences of varying length may be performed. The Mutual Rank Ratio statistic discussed herein may incorporate the above-described features.

A statistical technique for studying LNRE distributions may include constructing a frequency spectrum. A frequency spectrum may include a ranked list in which elements that occur at the same frequency are assigned the same rank. In an embodiment, the most frequently occurring element or elements in the frequency spectrum may be assigned a rank of "1." LNRE distributions may be defined by a function that relates rank in the frequency spectrum to underlying probabilities. For reasonably large samples, the relative ranks may thus remain fairly stable since large differences in rank may correspond to a large difference in the underlying probabilities.

When a frequency spectrum is constructed, some frequencies may not be represented. For example, particularly in the highest ranks, gaps in frequency counts may exist between ranks. This may reflect the inverse probability function underlying observed frequency data.

In an embodiment, if statistical evidence from a first sample of observed data suggests that elements in the frequency spectrum are ordered in a particular fashion, a second sample containing the same underlying distribution may have substantially similar ranks. Moreover, because the ranks in the LNRE frequency spectrum reflect an inverse relationship to frequency, the ratio between the ranks may be significant. For example, if an event is placed at rank 100 in the spectrum for the first sample and at rank 50 in the spectrum for the second sample, this may correspond to at least a 2:1 difference in the underlying probabilities based on the value of the α parameter.

The principles described above may also be applied to frequency information for events that are not independent of each other, such as frequency information for bigrams and trigrams. While the value of the α parameter may differ for non-independent events, sequences of different length may still yield equivalent Maximum Likelihood Estimates if they occur at the same frequency. Accordingly, it may be possible to combine the frequency spectra by assigning common ranks to elements of the same frequency. The resulting combined frequency spectrum may preserve the basic rank-order relationship among probabilities. While exact differences in probability may not be estimable from a combined spectrum, ordinal differences between ranks may still reflect relative probability, and large differences in the ratio between ranks may correspond to correspondingly large differences in probability.

Accordingly, a Rank Ratio statistic may be calculated based on the above considerations. Each word in a corpus may appear in a set of bigrams, trigrams and possibly longer n-gram sequences. Each n-gram may then be converted into a word-context pair. For example, the phrase "hot dog" may correspond to "hot" in the context "_____dog" and to "dog" in the context "hot_____." A complete set of contexts for a word may constitute its comparison set. For example, the comparison set for "dog" may further include "the_____," "the hot_____," "the_____barked," "_____barked," and so forth.

The comparison set may then be examined in, for example, two different ways. A first determination may be made as to whether the frequencies of elements in the comparison set may reflect the unconditional probabilities of each context in the language as a whole. A second determination may be made as to whether the frequencies of elements in the comparison set are conditioned upon the word which occupies the blank in each context. Rankings may be constructed for each of these determinations: one ranking based upon the observed frequency of each word-context pair and one ranking based on global context frequencies without regard for which word fills the blank. A resulting Rank Ratio statistic may be equal to the global rank divided by the local rank and may indicate the strength of word-context association.

The basic Rank Ratio statistic may evaluate the relationship between a word and a word sequence. However, the Rank Ratio statistic may be extended to phrases as well. If a phrase is a phrasal term, such as "hot dog," it may be expected that the Rank Ratio for "_____dog" conditioned upon "hot" would be very high and that the Rank Ratio for "hot_____" conditioned upon "dog" would be very high as well. As such, the product of the Rank Ratios may reflect one way of determining the underlying strength of association for a phrasal term. By normalizing the resulting product for the number of component terms, the resulting measure may be applied to candidate terms of any length. This normalized product may be termed the Mutual Rank Ratio.

In an embodiment, the Mutual Rank Ratio may be determined using a corpus that, for example, covers a wide range of reading materials including one or more levels of textual complexity. The corpus may be tokenized into individual words by a tokenizing software program or other similar means. In an embodiment, punctuation marks and/or stopwords, such as the most frequent word forms, may be excluded from the result of the tokenization process. In an embodiment, lists of bigrams, trigrams, and/or other n-grams may be extracted and ranked. In an embodiment, n-grams including punctuation marks and/or stopwords may be excluded from the ranking. Rank Ratios may be calculated from a comparison set including contexts derivable from the n-grams. For bigrams, the contexts may be of the forms: "<word1>_____" and "_____<word2>." For trigrams, the contexts may be of the forms: "<word1><word2>_____," "<word1>_____<word3>," and "_____<word2><word3>." In general, the contexts for an n-gram may include the set described by $$\sum_{i=1}^{n} [w_1 \ldots \char`\^w_i \ldots w_n],$$

where $w_i$, for i=1 to n, are the words in the n-gram and $\char`\^w_i$ is the word omitted from the n-gram for the particular context.

FIG. 1 depicts a flow diagram for a method of identifying phrasal terms from a corpus according to an embodiment. As shown in FIG. 1, a corpus may initially be received 105. The corpus may have a plurality of words. An exemplary corpus may include the Lexile Corpus from Metametrics Corporation, which contains approximately 400 million words.

Upon receiving the corpus, a plurality of contexts may be determined 110. A context, as described above, may include one or more fixed words (i.e., context words) and one or more gaps. Each context may include or be proximate to at least one word in the corpus. In an embodiment, groupings containing stopwords and/or punctuation marks may not be considered contexts for purposes of determining phrasal terms.

For each context, a number of occurrences within the corpus may be determined 115, and a global rank may be assigned 120 to the context based on the number of occurrences. In an embodiment, a global rank of "1" may correspond to the context that most often occurs within the corpus; a global rank of "2" may correspond to the context that is the next most likely to occur within the corpus; and so on.

For each context that fills its gap with a particular word (a word-context pair), a number of occurrences of the word-context pair may be determined 125, and a local rank may be assigned 130 to the word-context pair based on the number of occurrences. In an embodiment, a local rank of "1" may correspond to the word-context pair that most often occurs with the context; a local rank of "2" may correspond to the word-context pair that is the next most likely to occur with the context; and so on.

A Rank Ratio may then be determined 135 for each word-context pair based on the global rank for each context and the local rank for each word-context pair corresponding to a context. In an embodiment, the Rank Ratio may be equal to the global rank for a context divided by the local rank for a word-context pair corresponding to the context. The Rank Ratios for all word-context pairs may represent a determination of the strength of the association between the word and the context.

In an embodiment, a Mutual Rank Ratio value may be determined 140 based on the Rank Ratios for particular word-context pairs pertaining to the same phrasal term. For example, for a bigram, the particular word-context pairs may include a context of "<word1>_____" conditioned upon the use of the word "<word2>" and a context of "_____ <word2>" conditioned upon the use of the word "<word1>." Similarly, for a trigram, the particular word-context pairs may include a context of "<word1><word2>_____" conditioned upon the use of the word "<word3>," a context of "<word1>_____<word3>" conditioned upon the use of the word "<word2>," and a context of "_____<word2><word3>" conditioned upon the use of the word "<word1>." Similar constructions may be formulated for n-grams of any size.

Upon determining the particular word-context pairs, the Mutual Rank Ratio may be determined 140 by computing the product of the particular word-context pairs. In an embodiment, a normalizing constant may additionally be used as part of the product. The normalizing constant may be used to appropriately combine contexts of differing lengths in a single output list. In an embodiment, the normalizing constant may be based upon the number of words in a context. In an embodiment, normalization may include computing an nth root of the products of the Rank Ratios for a given n-gram. In other words, the normalized or mutual rank ratio may equal $$\sqrt[n]{RankRatio(w_1, [\_w2...w_n]) * RankRatio(w_2, [w_1\_...w_n]) * RankRatio(w_n, [w_1...w_{n-1}\_])},$$

where RankRatio (word, context) is the Rank Ratio for the word given the context.

Phrasal terms may be identified 145 based on the computed Mutual Rank Ratios. In an embodiment, phrasal terms may be selected by choosing the phrases that have the highest-ranking Mutual Rank Ratio values.

Figure 2:
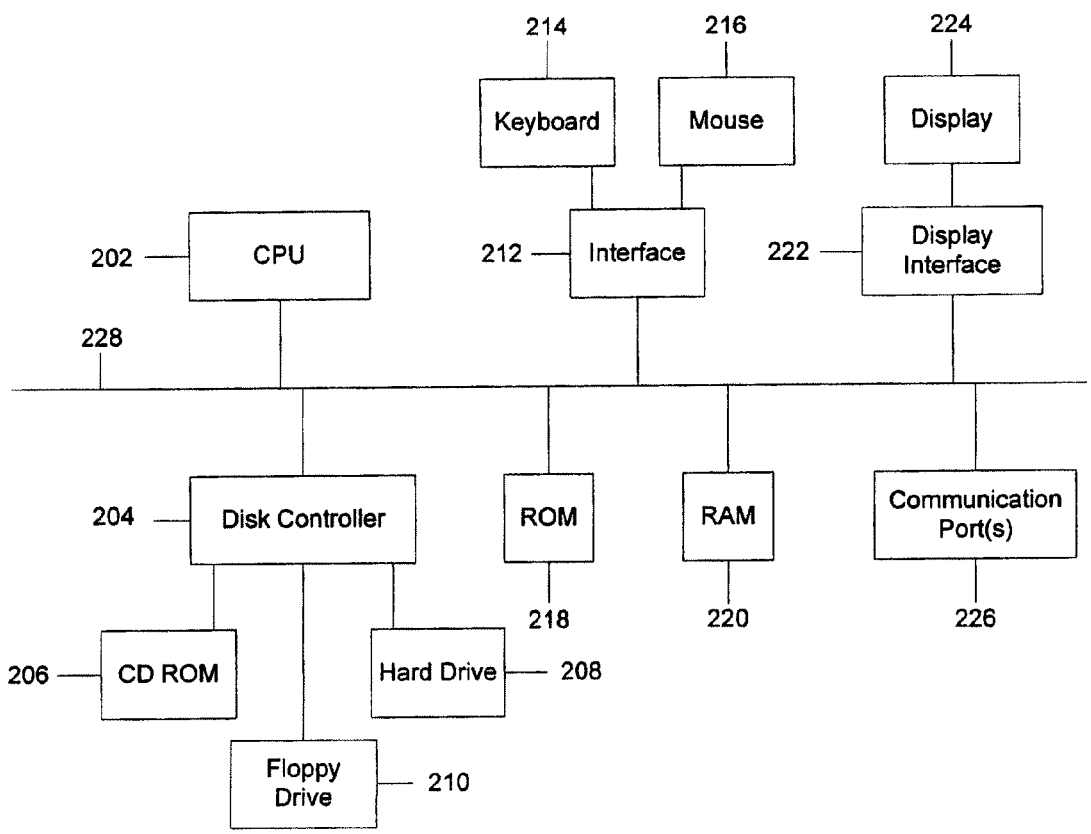
FIG. 2 is a block diagram of exemplary internal hardware that may be used to contain or implement program instructions according to an embodiment.

FIG. 2 is a block diagram of exemplary internal hardware that may be used to contain or implement program instructions according to an embodiment. Referring to FIG. 2, a bus 228 serves as the main information highway interconnecting the other illustrated components of the hardware. CPU 202 is the central processing unit of the system, performing calculations and logic operations required to execute a program. Read only memory (ROM) 218 and random access memory (RAM) 220 constitute exemplary memory devices.

A disk controller 204 interfaces with one or more optional disk drives to the system bus 228. These disk drives may be external or internal floppy disk drives such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to the standard computer-type components, the hardware may also include an interface 212 which allows for receipt of data from input devices such as a keyboard 214 or other input device 216 such as a remote control, pointer and/or joystick.

An embedded system may optionally be used to perform one, some or all of the disclosed operations. Likewise, a multiprocessor system may optionally be used to perform one, some or all of the disclosed operations.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the disclosed embodiments.

What is claimed is:

1. A computer implemented method for identifying phrasal terms, the method comprising:
   receiving a text having a plurality of words using a processing system;
   determining a plurality of contexts using the processing system, wherein a context comprises one or more words proximate to another word in the text;
   for each context, determining a first frequency using the processing system based on a number of occurrences of the context within the text;
   assigning a first rank to at least one context using the processing system based on the first frequency for the at least one context;
   determining multiple word-context pairs using the processing system;
   for each word-context pair, determining a second frequency using the processing system based on a number of occurrences of the word associated with the word-context pair being used in the context;
   assigning a second rank to at least one word-context pair using the processing system based on the second frequency for the at least one word-context pair;

determining a rank ratio for each word-context pair based on the first rank and the second rank associated with the word-context pair using the processing system;

determining a mutual rank ratio using the processing system based on multiple rank ratios; and identifying a phrasal term using the processing system based on the mutual rank ratio.

2. The method of claim 1, wherein determining a mutual rank ratio comprises:

selecting a first rank ratio for a first word-context pair, wherein the word in the first word-context pair comprises a first word, wherein the context in the first word-context pair comprises a second word following the word in the first word-context pair;

selecting a second rank ratio for a second word-context pair, wherein the word in the second word-context pair comprises the second word, wherein the context in the second word-context pair comprises the first word preceding the word in the second word-context pair; and multiplying the first rank ratio by the second rank ratio to determine the mutual rank ratio.

3. The method of claim 1, wherein determining a mutual rank ratio comprises:

selecting a first rank ratio for a first word-context pair, wherein the word in the first word-context pair comprises a first word, wherein the context in the first word-context pair comprises a second word following the word in the first word-context pair and a third word following the second word;

selecting a second rank ratio for a second word-context pair, wherein the word in the second word-context pair comprises the second word, wherein the context in the second word-context pair comprises the first word preceding the word in the second word-context pair and the third word following the word in the second word-context pair;

selecting a third rank ratio for a third word-context pair, wherein the word in the third word-context pair comprises the third word, wherein the context in the third word-context pair comprises the first word preceding the second word and the second word preceding the word in the third word-context pair;

multiplying the first rank ratio, the second rank ratio and the third rank ratio to determine the mutual rank ratio.

4. The method of claim 1, wherein determining the mutual rank ratio comprises:

computing a product of the one or more rank ratios corresponding to an n-gram;

determining an $n^{th}$ root of the product; and assigning the $n^{th}$ root of the product to the mutual rank ratio for the n-gram.

5. The method of claim 1, wherein the plurality of contexts comprises a bigram.

6. The method of claim 1, wherein the plurality of contexts comprises a trigram.

7. The method of claim 1, wherein at least one of the contexts comprises a gap.

8. The method of claim 1, wherein each context comprises no stopwords.

9. The method of claim 1, wherein identifying a phrasal term using the mutual rank ratio comprises choosing a phrase that has a highest-ranking mutual rank ratio.

10. The method of claim 1, wherein the rank ratio for each word-context pair is determined to be the first rank associated with the word-context pair divided by the second rank associated with the word-context pair.

11. A system for identifying phrasal terms, the system comprising:

a processor; and a memory, wherein the processor is configured to execute steps comprising:

receiving a text having a plurality of words;

determining a plurality of contexts, wherein a context comprises one or more words proximate to another word in the text;

for each context, determining a first frequency based on a number of occurrences of the context within the text;

assigning a first rank to at least one context based on the first frequency for the at least one context;

determining multiple word-context pairs;

for each word-context pair, determining a second frequency based on a number of occurrences of the word associated with the word-context pair being used in the context;

assigning a second rank to at least one word-context pair based on the second frequency for the at least one word-context pair;

determining a rank ratio for each word-context pair based on the first rank and the second rank associated with the word-context pair;

determining a mutual rank ratio based on multiple rank ratios; and identifying a phrasal term based on the mutual rank ratio.

12. The system of claim 11, wherein determining a mutual rank ratio comprises:

selecting a first rank ratio for a first word-context pair, wherein the word in the first word-context pair comprises a first word, wherein the context in the first word-context pair comprises a second word following the word in the first word-context pair;

selecting a second rank ratio for a second word-context pair, wherein the word in the second word-context pair comprises the second word, wherein the context in the second word-context pair comprises the first word preceding the word in the second word-context pair; and multiplying the first rank ratio by the second rank ratio to determine the mutual rank ratio.

13. The system of claim 11, wherein determining a mutual rank ratio comprises:

selecting a first rank ratio for a first word-context pair, wherein the word in the first word-context pair comprises a first word, wherein the context in the first word-context pair comprises a second word following the word in the first word-context pair and a third word following the second word;

selecting a second rank ratio for a second word-context pair, wherein the word in the second word-context pair comprises the second word, wherein the context in the second word-context pair comprises the first word preceding the word in the second word-context pair and the third word following the word in the second word-context pair;

selecting a third rank ratio for a third word-context pair, wherein the word in the third word-context pair comprises the third word, wherein the context in the third word-context pair comprises the first word preceding the second word and the second word preceding the word in the third word-context pair;

multiplying the first rank ratio, the second rank ratio and the third rank ratio to determine the mutual rank ratio.

14. The system of claim 11, wherein determining a mutual rank ratio comprises:

computing a product of the one or more rank ratios corresponding to an n-gram;
determining an $n^{th}$ root of the product; and
assigning the $n^{th}$ root of the product to the mutual rank ratio for the n-gram.

15. The system of claim 11, wherein the plurality of contexts comprises a bigram.

16. The system of claim 11, wherein the plurality of contexts comprises a trigram.

17. The system of claim 11, wherein at least one of the contexts comprises a gap.

18. The system of claim 11, wherein each context comprises no stopwords.

19. The system of claim 11, wherein identifying a phrasal term using the mutual rank ratio comprises choosing a phrase that has a highest-ranking mutual rank ratio.

20. The system of claim 11, wherein the rank ratio for each word-context pair is determined to be the first rank associated with the word-context pair divided by the second rank associated with the word-context pair.

21. An article of manufacture comprising a storage device in the form of a memory or a computer readable disk, the storage device comprising programming instructions for identifying phrasal terms in a text, the programming instructions when executed causing a processing system to carry out steps comprising:
receiving a text having a plurality of words;
determining a plurality of context, wherein a context comprises one or more words proximate to another word in the text;
for each context, determining a first frequency based on a number of occurrences of the context within the text;
assigning a first rank to at least one context based on the first frequency for the at least one context;
determining multiple word-context pairs;
for each word-context pair, determining a second frequency based on a number of occurrences of the word associated with the word-context pair being used in the context;
assigning a second rank to at least one word-context pair based on the second frequency for the at least one word-context pair;
determining a rank ratio for each word-context pair based on the first rank and the second rank associated with the word-context pair;
determining a mutual rank ratio based on multiple rank ratios; and
identifying a phrasal term based on the mutual rank ratio.

22. The article of claim 21, wherein determining a mutual rank ratio comprises:
selecting a first rank ratio for a first word-context pair, wherein the word in the first word-context pair comprises a first word, wherein the context in the first word-context pair comprises a second word following the word in the first word-context pair;
selecting a second rank ratio for a second word-context pair, wherein the word in the second word-context pair comprises the second word, wherein the context in the second word-context pair comprises the first word preceding the word in the second word-context pair; and
multiplying the first rank ratio by the second rank ratio to determine the mutual rank ratio.

23. The article of claim 21, wherein determining a mutual rank ratio comprises:
selecting a first rank ratio for a first word-context pair, wherein the word in the first word-context pair comprises a first word, wherein the context in the first word-context pair comprises a second word following the word in the first word-context pair and a third word following the second word;
selecting a second rank ratio for a second word-context pair, wherein the word in the second word-context pair comprises the second word, wherein the context in the second word-context pair comprises the first word preceding the word in the second word-context pair and the third word following the word in the second word-context pair;
selecting a third rank ratio for a third word-context pair, wherein the word in the third word-context pair comprises the third word, wherein the context in the third word-context pair comprises the first word preceding the second word and the second word preceding the word in the third word-context pair;
multiplying the first rank ratio, the second rank ratio and the third rank ratio to determine the mutual rank ratio.

24. The article of claim 21, wherein determining a mutual rank ratio comprises:
computing a product of the one or more rank ratios corresponding to an n-gram;
determining an $n^{th}$ root of the product; and
assigning the $n^{th}$ root of the product to the mutual rank ratio for the n-gram.

25. The article of claim 21, wherein the plurality of contexts comprises a bigram.

26. The article of claim 21, wherein the plurality of contexts comprises a trigram.

27. The article of claim 21, wherein at least one of the context comprises a gap.

28. The article of claim 21, wherein each context comprises no stopwords.

29. The article of claim 21, wherein identifying a phrasal term using the mutual rank ratio comprises choosing a phrase that has a highest-ranking mutual rank ratio.

30. The article of claim 21, wherein the rank ratio for each word-context pair is determined to be the first rank associated with the word-context pair divided by the second rank associated with the word-context pair.

* * * * *